United States Patent [19]

Naruse

[11] Patent Number: 5,433,478
[45] Date of Patent: Jul. 18, 1995

[54] IMPACT-ABSORBING STRUCTURE OF A DOOR TRIM

[75] Inventor: Yasumichi Naruse, Toyota, Japan

[73] Assignee: Toyota Jidosha Kabushiki Kaisha, Toyota, Japan

[21] Appl. No.: 84,160

[22] Filed: Jul. 1, 1993

[30] Foreign Application Priority Data

Jul. 2, 1992 [JP] Japan .................................. 4-175479
Jun. 30, 1993 [JP] Japan .................................. 5-162524

[51] Int. Cl.$^6$ ............................................. B60R 21/04
[52] U.S. Cl. ................................ 280/751; 296/146.6; 296/146.7
[58] Field of Search .................. 280/748, 751, 752; 296/146.1, 146.6, 146.7, 153

[56] References Cited

U.S. PATENT DOCUMENTS

| | | | |
|---|---|---|---|
| 3,989,275 | 11/1976 | Finch et al. | 280/751 |
| 4,769,951 | 9/1988 | Kaaden | 49/502 |
| 4,786,100 | 11/1988 | Kleemann et al. | 296/146.6 |
| 4,925,224 | 5/1990 | Smiszek | 293/120 |
| 5,102,163 | 4/1992 | Ishikawa | 280/751 |
| 5,306,066 | 4/1994 | Saathoff | 280/751 |

FOREIGN PATENT DOCUMENTS

| | | |
|---|---|---|
| 5759139 | 9/1955 | Japan . |
| 5839359 | 9/1956 | Japan . |
| 56-75234 | 6/1981 | Japan . |
| 2267046 | 10/1990 | Japan . |
| 4128912 | 11/1992 | Japan . |

Primary Examiner—Margaret A. Focarino
Assistant Examiner—Paul N. Dickson
Attorney, Agent, or Firm—Cushman, Darby & Cushman

[57] ABSTRACT

An impact-absorbing structure of a door trim mounted to a door member at an interior side of a vehicle. The door member is located at a transverse direction side portion of the vehicle. The door trim is formed with a plurality of ribs which extend from the door trim toward an exterior of the vehicle and oppose the door member. When impact load is imparted to the door member due to a side collision of the vehicle, the door member abuts the ribs which then plastically deform, thereby absorbing the impact load. Further, lengths of the ribs are such that distances between the door member and respective end portions of the ribs differ in a plurality of stages. Moreover, the plurality of ribs have respective rigidities which decrease in accordance with a decrease in the distance between the end portion of the rib and the door member.

25 Claims, 6 Drawing Sheets

IMPACT-ABSORBING STRUCTURE OF A DOOR TRIM

BACKGROUND OF THE INVENTION

1. Field of the Invention

The present invention relates to an impact-absorbing structure of a door trim for use in a vehicle such as an automobile. In particular, the present invention relates to an impact-absorbing structure which is adapted to absorb impact through the plastic deformation of ribs which are provided on a door trim when the door member is forced into contact with the ribs by application of impact load to the door member due to a side collision of the vehicle.

2. Description of the Related Art

In a vehicle, in particular, an automobile, numerous structures have been devised in order to protect occupants against a side collision of the vehicle. In general, these structures employ an impact-absorbing member which is located within each door, but is structurally independent of the door. The impact-absorbing member is made of polyurethane foam, polystyrene foam, or the like. Accordingly, the impact-absorbing member is subject to plastic deformation due to the side collision, thereby absorbing impact from the exterior of the vehicle (see Japanese Utility Model Application Laid-Open No. 58-39359.)

However, a drawback is that the above structure is costly because the impact-absorbing member and the door separately form the structure, which increases the number of components. In addition, the many assembly processes involved in the manufacturing of the impact-absorbing member also lead to a rise in the cost of the structure.

A countermeasure against this drawback has been directed to ribs which are positioned on a door trim in order to accomplish an original object of the ribs, i.e., to increase the rigidity of the door trim. Accordingly, the ribs have been designed to be utilized as impact-absorbing members. FIG. 9 through FIG. 11 illustrate cross-sectional views of a conventional door trim in which ribs are used as absorbent members.

The above-mentioned ribs will now be described with reference to FIG. 9 through FIG. 11. In order to utilize the door trim as an impact-absorbing member, lengths of ribs 3 must be large enough to allow the plastic deformation of the ribs 3, as illustrated in FIG. 9. Impact load, which acts on a door member 1, is first transmitted therefrom to a door trim 2, and is then conducted to an occupant via the door trim 2. At the same time, as shown in FIG. 10, the door member 1 is thereby moved toward an interior of a vehicle, and is brought Into contact with the ribs 3 which are mounted to the door trim 2. Impact load is thereby imparted to the door trim 2, and gradually increases. The impact load shortly reaches an initial load where plastic deformation occurs in the ribs 3. This deformation permits the ribs 3 to absorb the impact load that is applied from the exterior of the vehicle. As a result, impact load imparted to the occupant is reduced. The larger the increase in impact load, the greater the amount of the deformation of the ribs 3. As shown in FIG. 11, when a final load is reached over time, the ribs 3 are broken and can no longer absorb the impact.

In order to absorb impact successfully, the greatest value of impact load applied to the occupant must be lowered. However, such a maximum value is variable because a load caused by a collision involves various factors of disturbance. When the rigidity of the ribs 3 is raised to increase the impact-absorbing ability thereof, insufficient or little plastic deformation may occur in the ribs 3 when the maximum value of impact load is small. This case results in insufficient absorbing ability of the ribs 3. In the inverse case, a lower degree of rigidity causes the plastic deformation of the ribs 3 when the maximum value of impact load is smaller. As a result, the impact load can be absorbed. However, the ribs 3 are easily broken when the maximum value of impact load is greater. Further, since the ribs 3 have a smaller impact-absorbing ability in this case, it is difficult to adjust the ribs 3 in order to lower the maximum value of impact load that is applied to the occupant.

SUMMARY OF THE INVENTION

In view of the aforesaid, an object of the present invention is to provide a door trim having a plurality of ribs having different rigidities so as to absorb impact loads of different magnitudes, thereby offering sufficient impact-absorbing ability and characteristics regardless of the magnitude of the greatest value of actual impact load.

An impact-absorbing structure of the door trim according to the present invention comprises: a door member located at a transverse direction side portion of a vehicle; a door trim mounted to the door member at an interior side of the vehicle; and, a plurality of ribs extending from the door trim toward an exterior of the vehicle and opposing the door member, the ribs absorbing impact load by abutting the door member and plastically deforming when impact load is applied to the door member due to a side collision of the vehicle. The lengths of the ribs are such that distances between the door member and respective end portions of the ribs opposing the door member differ in a plurality of stages. In addition, the plurality of ribs have respective rigidities which decrease In accordance with a decrease in the distance between the end portion of the rib and the door member.

In the above structure according to the present invention, when impact load is applied to the door member due to a side collision of the vehicle, the door member is initially forced into contact with the respective distal ends of the ribs which lave the lowest rigidity and which are located closest to the door member. Thereafter, increased impact load leads to the plastic deformation of the above ribs, which absorb the impact force. With a smaller degree of impact load, the plastic deformation of the rib is sufficient to absorb such an impact. However, when the impact load is large, the impact load cannot be absorbed by the plastic deformation of the rib, and the rib breaks. However, according to the present invention, the ribs are positioned so as to oppose door member, and the distal end portions of the ribs are spaced apart from the door member at different stages of distances. Accordingly, when the above-mentioned rib is broken because it is unable to absorb the load, the door member is then forced against the next closest ribs, i.e., ribs of the next stage. These ribs plastically deform so as to absorb the impact load. Since the distal end portions of the ribs are spaced at different distances from the door member, i.e., the lengths from the distal end portions of the ribs to the door member vary in stages, the ribs can be provided with proper rigidity to absorb impacts of the greatest impact loads of the allowable ranges of the ribs. As a result, a maximum value of impact load which is transmitted to an occupant can be reliably lowered regardless of the magnitude of the impact load applied from the exterior.

In the impact-absorbing structure according to the present invention, the ribs have different rigidities so as to absorb shocks of different impact loads. Accordingly, when the greatest loads within permissible ranges of the ribs are imparted to the ribs, the ribs can absorb the impacts regardless of the magnitude of a maximum value of actual impact load. As a result, tills structure can provide an impact-absorbing ability corresponding to the magnitude of impact load which is applied from the exterior of the vehicle. This ability can reliably decrease the maximum value of impact load that is imparted to the occupant, and can successfully absorb impact load caused by a collision.

In conclusion, the present invention provides the impact-absorbing structure of the door trim which has sufficient impact-absorbing ability and characteristics, while conventional structures require an impact-absorbing member which is structurally independent of a door. Further, the impact-absorbing structure in accordance with the present invention can be made at lower cost with fewer components and a shorter assembling process.

DESCRIPTION OF THE PREFERRED EMBODIMENT

An embodiment of the present invention will be described with reference to FIG. 1 through FIG. 4.

Figure 1:
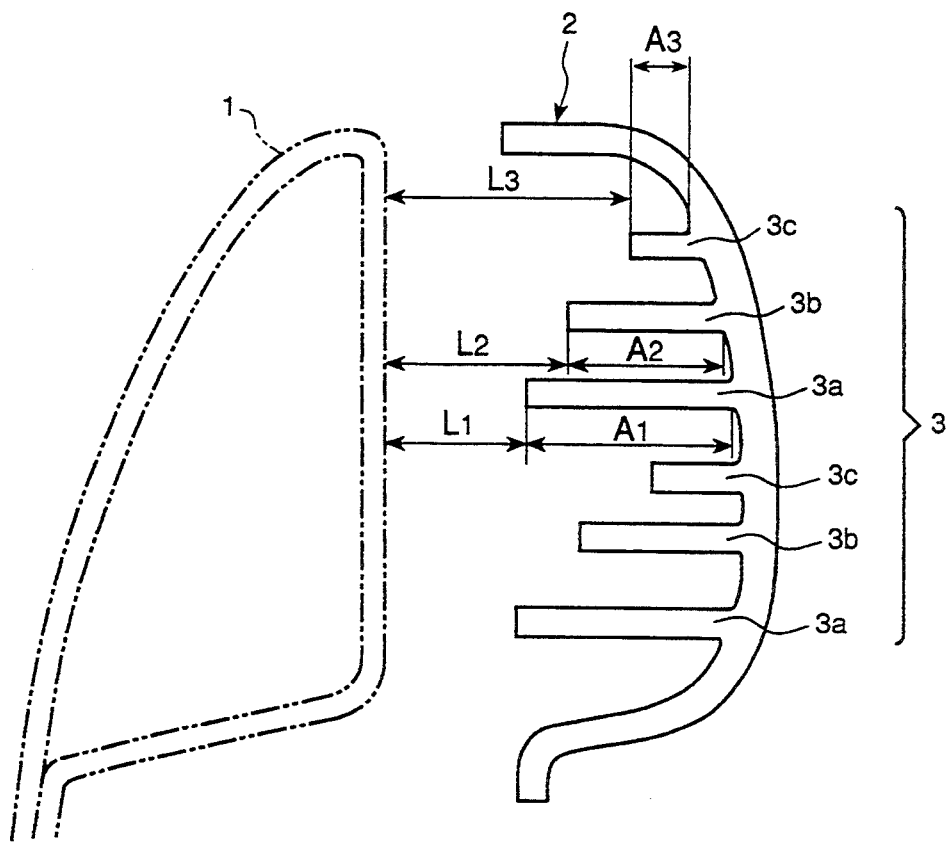
FIG. 1 is a schematic cross-sectional view taken along line 1—1 of FIG. 4, illustrating an embodiment of the present invention.
Figure 2:
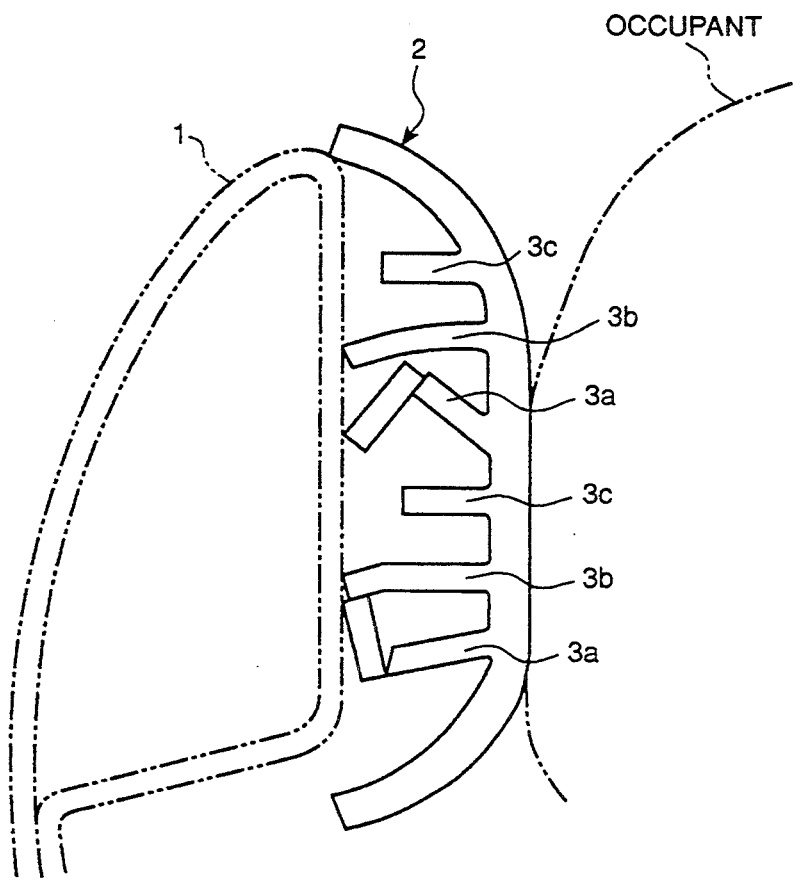
FIG. 2 is a schematic view corresponding to FIG. 1, illustrating the embodiment in which impact load is in the process of acting on a door member.
Figure 3:
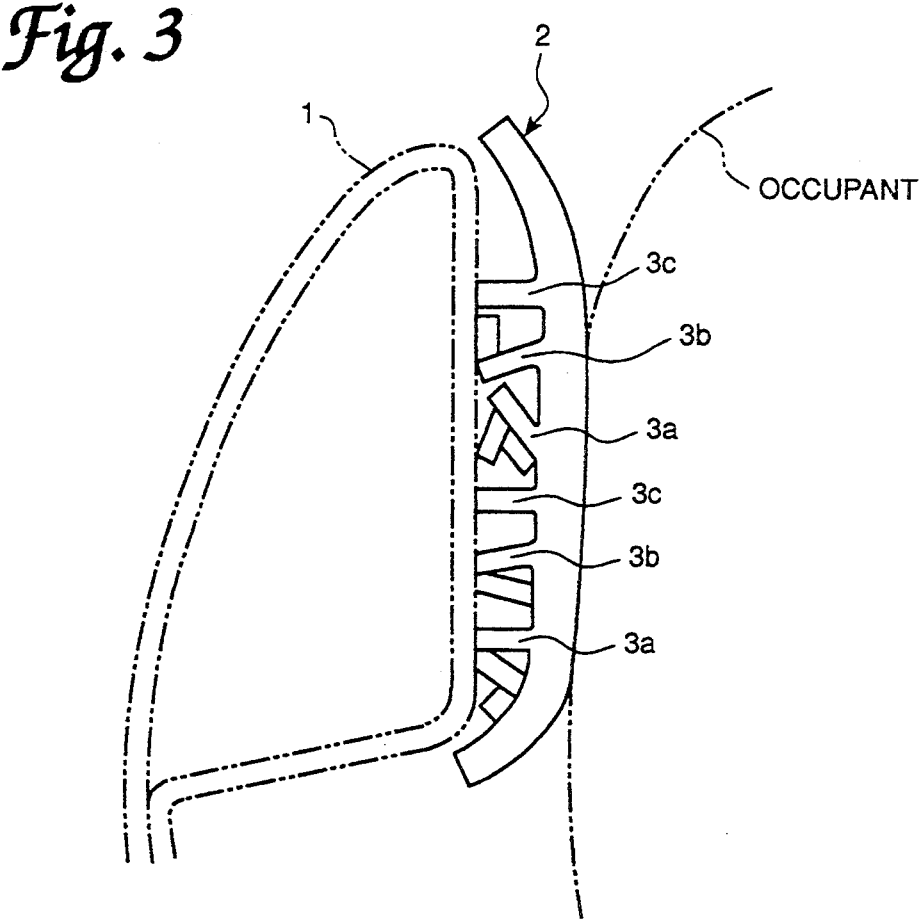
FIG. 3 is a schematic view corresponding to FIG. 1, showing the embodiment in a state after time has elapsed from the state illustrated in FIG. 2.
Figure 4:
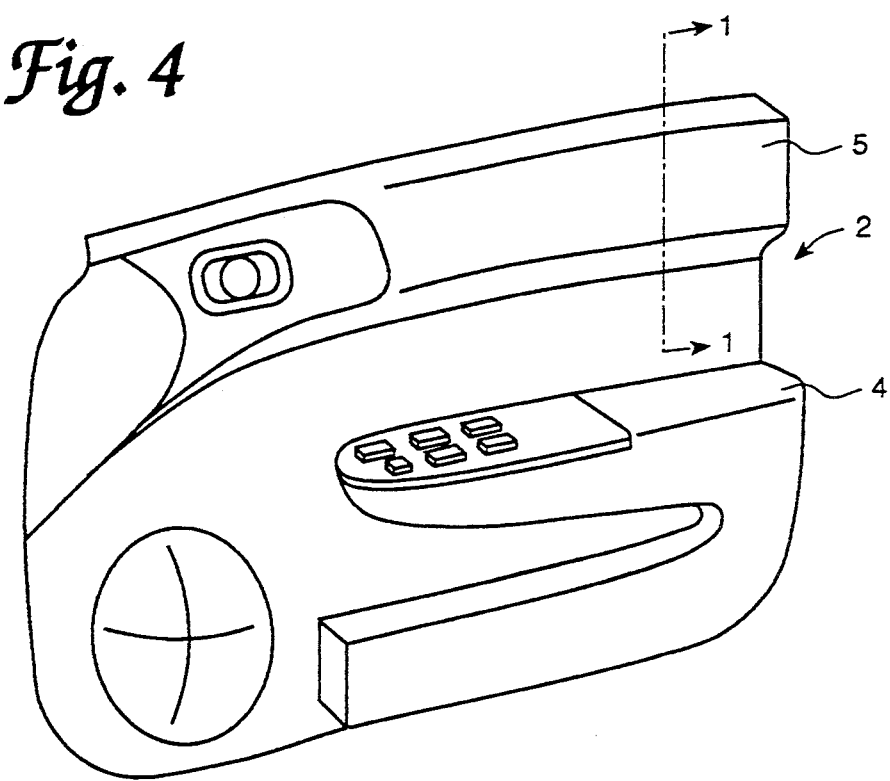
FIG. 4 is a schematic view when seen from an interior of a vehicle, showing a door trim which is applied to both the present invention and the related art.
Figure 5:
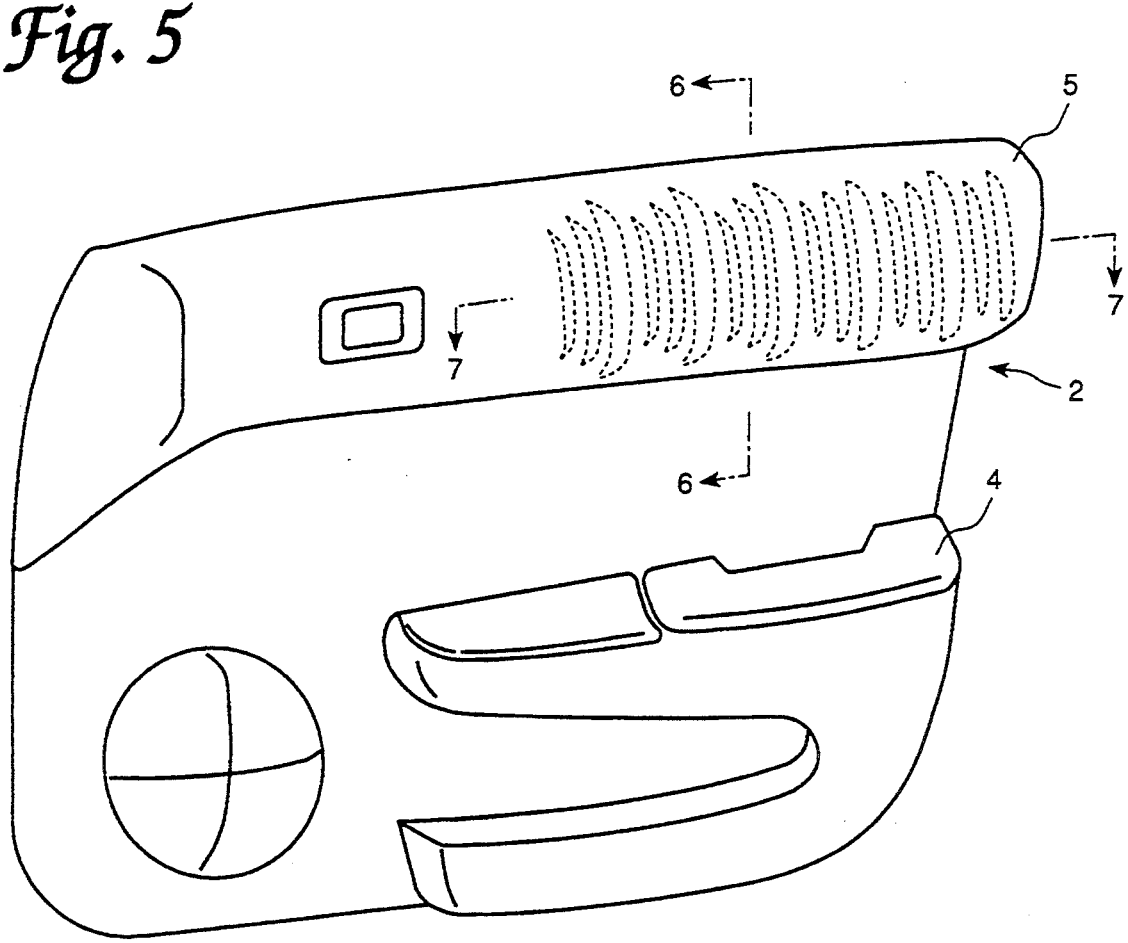
FIG. 5 is a schematic view of a door trim relating to another embodiment of the present invention as seen from an interior of a vehicle.
Figure 6:
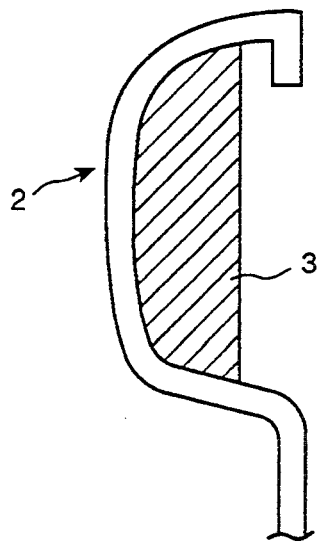
FIG. 6 is a schematic cross-sectional view taken along line 6—6 of FIG. 5, illustrating the other embodiment of the present application.
Figure 7:
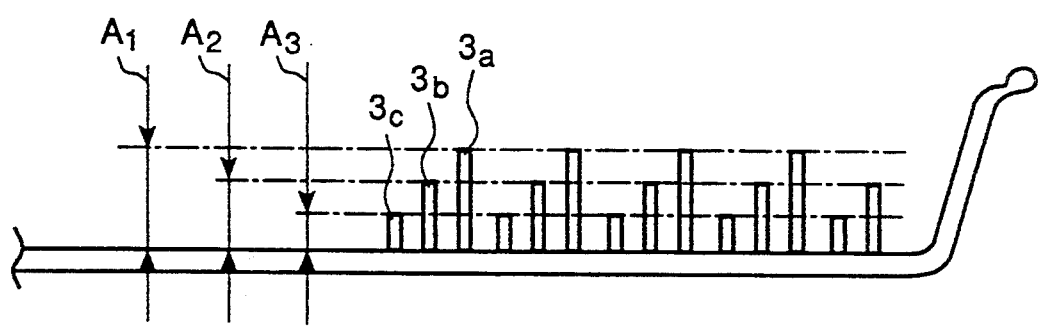
FIG. 7 is a schematic cross-sectional view taken along line 7—7 of FIG. 5, illustrating the other embodiment of the present invention.

FIG. 4 is a schematic view, illustrating a door trim which is located within an interior of a vehicle. FIG. 1 is a schematic cross-sectional view taken along line 1—1 of FIG. 4, illustrating the door trim. FIGS. 2 and 3 are cross-sectional views corresponding to FIG. 1, illustrating the operation of the present invention in which impact load is imparted to the door trim from the exterior of the vehicle.

A door member 1 forms part of a door. A door trim 2 is mounted to the door member 1 within the interior. The door trim 2 is provided with a plurality of ribs 3. As shown in FIG. 4, the door trim 2 is further formed by an arm rest 4 and a protruding portion 5, both of which extend therefrom toward the interior of the vehicle. The ribs 3 are located within the protruding portion 5 and the arm rest 4. As illustrated in FIG. 1, the ribs 3 extend toward the exterior of the vehicle so as to face the door member 1. The ribs 3 include three different ribs 3a, 3b, and 3c, whose distal end portions are spaced at successively larger distances L1, L2, and L3 from the door member 1. Accordingly, lengths A1, A2, and A3 of the ribs 3 decrease as the distances L1, L2, and L3 increase. As a result, the respective rigidities of the ribs 3 increase as the lengths of the ribs 3 decrease.

Figure 8:
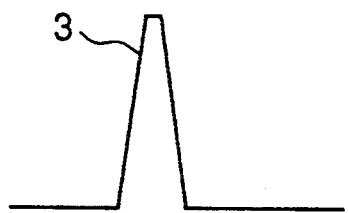
FIG. 8 is an expanded sectional view, corresponding to FIG. 7, of a rib relating to the other embodiment of the present invention.
Figure 9:
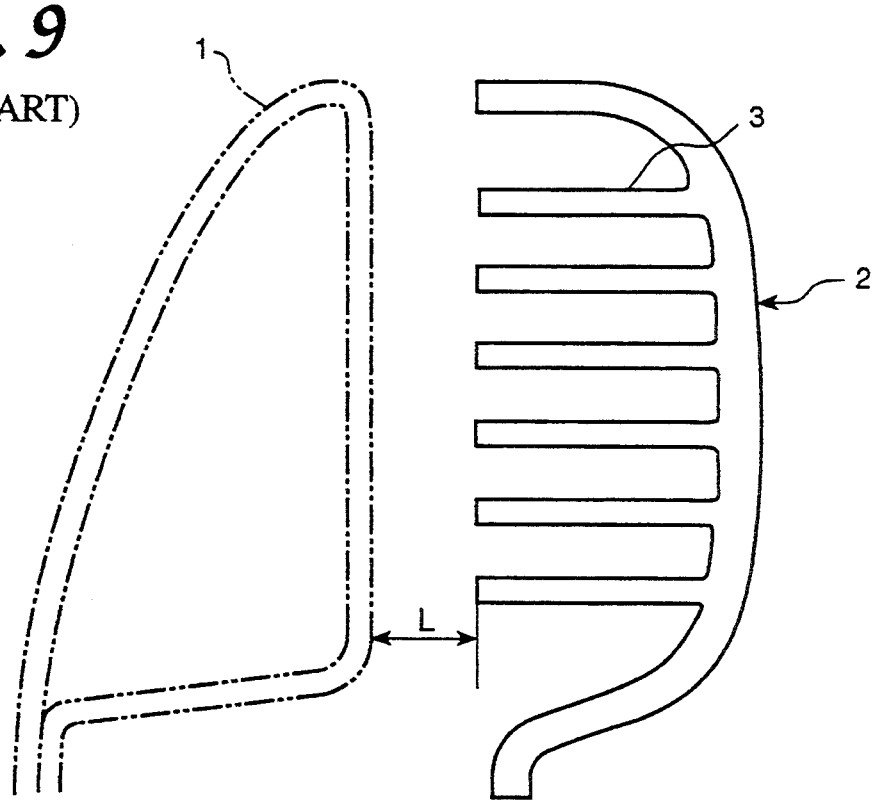
FIG. 9 is a schematic cross-sectional view taken along line 1—1 of FIG. 4, illustrating one example according to the related art.
Figure 10:
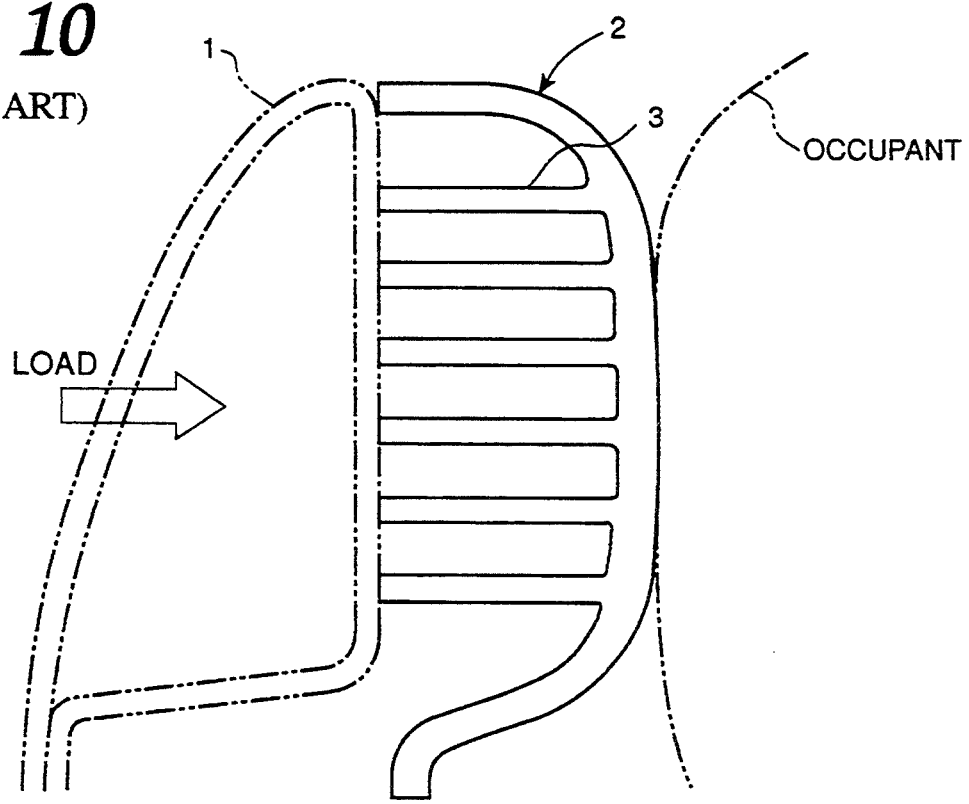
FIG. 10 is a schematic view corresponding to FIG. 9, illustrating the example in which impact load is in the process of acting on a door member.
Figure 11:
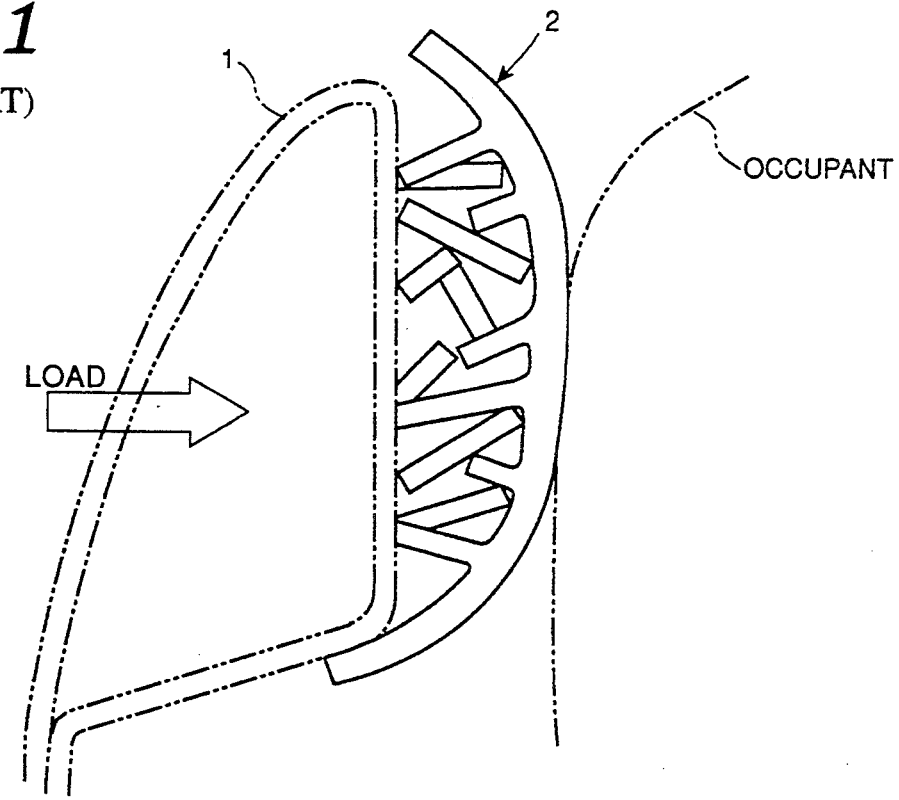
FIG. 11 is a schematic view corresponding to FIG. 9, showing the example in a state after time has elapsed from the state illustrated in FIG. 10.

In the above-described embodiment, the ribs 3a, 3b, 3c are aligned in the vertical direction of the vehicle. However, the present invention is not limited to the same. As illustrated in FIGS. 5 through 8, the ribs 3a, 3b, 3c may be aligned in the longitudinal direction of the vehicle. In this case, as illustrated in FIG. 8, taper portions are provided at the ribs 3a, 3b, 3c so that the respective lengths, in the longitudinal direction of the vehicle, of the distal end portions of the ribs 3a, 3b, 3c are shorter than the respective lengths of the base end portions which are connected to the door trim 2.

The following Table 1 through Table 3 illustrate experimental data of load characteristics in accordance with various rib shapes.

Table 1 shows five different examples of rib shapes, No. (1) through No. (3), and restricting conditions associated therewith.

The restricting conditions indicate fixed conditions of an assembled body to be described later, which were established in order to conduct the experiment. The experiment was carried out in the following manner. As a first step, each set of ribs was combined with a plate having a substantially U-shaped cross-section, so as to form different assemblies. The plate corresponds to a door trim. Next, the assembly was anchored to a base so as to stand upright. In this case, a lowermost end portion of the upright assembly was prevented from moving in both vertical and transverse directions of the assembly. (The ribs were aligned on the plate in the transverse direction of the assembly.) In addition, an uppermost end portion of the assembly was allowed to move in the vertical direction thereof, but was prevented from moving in the transverse direction of the assembly.

Thereafter, a compressing body was positioned on an opposite side of the base with respect to the assembly. The compressing body was then moved toward the base to apply a load to the set of ribs. The amounts by which distal ends of the ribs moved in accordance with variations in the load were measured. This determination was made for each type of rib shapes.

Tables 2 and 3 illustrate data according to the above measuring. The data in Table 2 are the results of tests performed with a composite-reinforced polypropylene resin molded material as a rib material. The composite-reinforced polypropylene resin molded material is often utilized as a material for the door trim. Table 3 shows the results of tests conducted with a high-crystal polypropylene resin molded material as the rib material. The high-crystal polypropylene resin molded material is lighter weight and easier to mold than the composite-reinforced polypropylene resin-molded material.

Two different characteristic curves are shown in Table 2 and Table 3. One characteristic curve shows an upper limit of an optimum characteristic, and the other illustrates a recommended characteristic. It is desirable that the characteristic of the set of ribs falls within the upper limit and approximates the recommended characteristic.

By comparing the examples of rib shapes No. (1) to No. (3), it is found that example No. (1), which was manufactured in accordance with the present invention, exhibits a characteristic closest to the recommended characteristic. Examples No. (2) and No. (3) are lower than the recommended characteristic over the entire range of displacements.

Next, operation of the present invention will be described.

In a side collision, impact load is imparted to a door member 1 from the exterior of the vehicle. The door member 1 is thereby moved toward the interior of the vehicle, and is displaced by distance L1 in a short time. The door member 1 then abuts the respective distal end portions of ribs 3a such that load is imparted thereto. This load gradually increases and is transmitted to an occupant until the ribs 3a achieve an initial load where the ribs 3a begin deforming. This plastic deformation permits the ribs 3a to absorb the impact load. However, the ribs 3a are soon broken when a final load is reached, which prevents further absorption of the impact load. Next, the door member 1 is brought into contact with ribs 3b, as illustrated in FIG. 2. When an initial load is applied to the ribs 3b, the ribs 3b begin deforming and absorb the impact load again. The ribs 3b are broken at the time of a final load thereof, and can therefore no longer absorb the impact load. At this time, as illustrated in FIG. 3, the door member i is further moved into contact with ribs 3c, which in turn undergo the same process.

Figure 12:
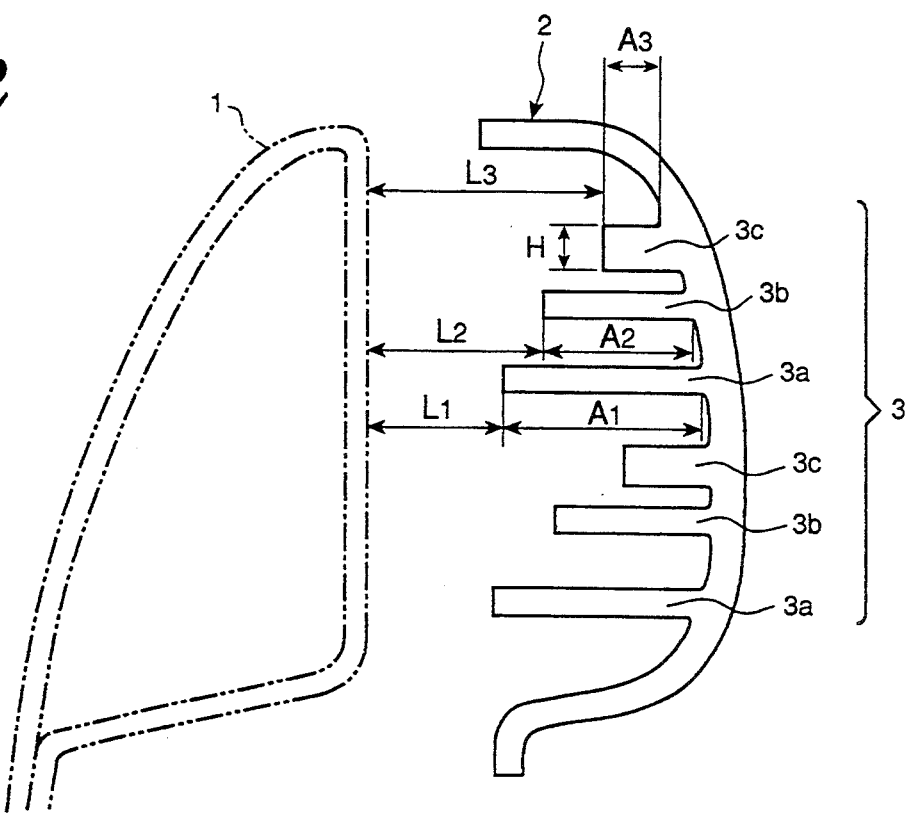
FIG. 12 is a schematic cross-sectional view illustrating another embodiment of the invention.

While respective rigidities of the ribs 3 vary in steps in accordance with only changes in lengths of the ribs 3 according to the above embodiment, there is another way to alter rigidity in a progressive fashion: the ribs 3 may be varied in thickness H and/or number for each different length of the ribs 3. Thus, as shown in FIG. 12, with the ribs 3 extending generally horizontally, the shortest ribs 3c have the greatest thickness H. Similarly, it can be appreciated that the ribs 3c of FIG. 7 can be made thicker than ribs 3a and 3b. Moreover, although the door trim 2 includes the ribs 3 which have three different rigidities, it is obvious that the present embodiment is not limited thereto. Alternatively, the ribs 3 may have a larger or smaller number of levels of rigidity. As a result, an impact-absorbing ability can be established according to the greatest impact loads of the allowable ranges of the ribs 3 regardless of the magnitude of a maximum value of actual impact load.

As above described, the door trim 2 is formed integrally with the ribs 3, whose distal end portions are spaced at successively larger distances, L1, L2, and L3, from the door member 1. Consequently, the lengths A1, A2, and A3 of the ribs 3 decrease as the distances L1, L2, and L3 increase. The ribs 3 thereby provide progressively increased rigidities which can successfully absorb any impact regardless of whether the impact load applied from the exterior of the vehicle is large or small.

What is claimed is:

1. An impact-absorbing structure of a door trim, comprising:
   a door member having a substantially vertical, planar portion, said door member being located at a transverse direction side portion of a vehicle;
   a door trim mounted to said door member at an interior side of said vehicle; and,
   a plurality of ribs extending from said door trim toward an exterior of said vehicle and opposing said planar portion, said ribs being constructed and arranged to absorb an impact load by abutting said planar portion and plastically deforming when an impact load is applied to said door member due to a side collision of said vehicle, lengths of said ribs being such that distances between said planar portion and respective tip end portions of said ribs opposing said planar portion differ in a plurality of stages, said respective tip end portions being spaced apart from said planar portion, and said plurality of ribs having respective rigidities which decrease in accordance with a decrease in the distance between each tip end portion of said rib and said planar portion, a length of each rib of said plurality of ribs being set so as to differ from a respective length of an adjacent rib.

2. An impact-absorbing structure of a door trim according to claim 1, wherein said door trim is made of a resin.

3. An impact-absorbing structure of a door trim according to claim 1, wherein said plurality of ribs are spaced apart from each other at uniform intervals.

4. An impact-absorbing structure of a door trim according to claim 1, wherein each rib of said plurality of ribs has a substantially rectangular cross-section when viewed from a longitudinal direction of said vehicle.

5. An impact-absorbing structure of a door trim according to claim 4, wherein said plurality of ribs are substantially, equal in thickness when viewed from a vertical direction of said vehicle.

6. An impact-absorbing structure of a door trim according to claim 4, wherein said plurality of ribs vary in thickness when viewed from a vertical direction of said vehicle in accordance with the length of said plurality of ribs when viewed from the transverse direction of said vehicle such that the Shortest length ribs have the greatest thickness.

7. An impact-absorbing structure of a door trim according to claim 1, wherein each rib of said plurality of ribs has a substantially rectangular cross-section when viewed from a vertical direction of said vehicle.

8. An impact-absorbing structure of a door trim according to claim 7, wherein said plurality of ribs are substantially equal in thickness when viewed from a longitudinal direction of said vehicle.

9. An impact-absorbing structure of a door trim according to claim 7, wherein said plurality of ribs vary in thickness when viewed from a longitudinal direction of said vehicle in accordance with lengths of said plurality of ribs when viewed from the transverse direction of said vehicle such that the shortest length ribs have the greatest thickness.

10. An impact-absorbing structure of a door trim according to claim 1, wherein the rigidity of said plurality of ribs is set in accordance with the number of said ribs of said plurality of stages.

11. An impact-absorbing structure of a door trim according to claim 1, wherein said plurality of ribs are made of a resin.

12. An impact-absorbing structure of a door trim according to claim 1, wherein said plurality of ribs are formed integrally with said door trim.

13. An impact-absorbing structure of a door trim, comprising:

a door member having a substantially vertical, planar portion, said door member being located at a transverse direction side portion of a vehicle;

a door trim made of a resin and mounted to said door member at an interior side of said vehicle; and, a plurality of ribs extending from said door trim toward an exterior of said vehicle and opposing said planar portion, said ribs being constructed and arranged to absorb an impact load by abutting said planar portion and plastically deforming when an impact load is applied to said door member due to a side collision of said vehicle, lengths of said ribs being such that distances between said planar portion and respective tip end portions of said ribs opposing said planar portion differ in a plurality of stages, said respective tip end portions being spaced apart from said planar portion and said plurality of ribs having respective rigidities which decrease in accordance with a decrease in the distance between each tip end portion of said ribs and said planar portion, a length of each rib of said plurality of ribs being set so as to differ from a respective length of an adjacent rib.

14. An impact-absorbing structure of a door trim according to claim 13, wherein said plurality of ribs are spaced apart from each other at uniform intervals.

15. An impact-absorbing structure of a door trim according to claim 13, wherein said plurality of ribs each has a substantially rectangular cross-section when viewed from a longitudinal direction of said vehicle.

16. An impact-absorbing structure of a door trim according to claim 15, wherein said plurality of rectangular ribs are substantially equal in height.

17. An impact-absorbing structure of a door trim according to claim 15, wherein said plurality of ribs vary in thickness when viewed from a vertical direction of said vehicle in accordance with lengths of said plurality of ribs when viewed from the transverse direction of said vehicle such that the shortest length ribs have the greatest thickness.

18. An impact-absorbing structure of a door trim according to claim 13, wherein said plurality of ribs each has a substantially rectangular cross-section when viewed from a vertical direction of said vehicle.

19. An impact-absorbing structure of a door trim according to claim 18, wherein said plurality of ribs are substantially equal in thickness when viewed from a longitudinal direction of said vehicle.

20. An impact-absorbing structure of a door trim according to claim 18, wherein said plurality of ribs vary in thickness when viewed from a longitudinal direction of said vehicle in accordance with lengths of said plurality of ribs when viewed from the transverse direction of said vehicle such that the shortest length ribs have the greatest thickness.

21. An impact-absorbing structure of a door trim according to claim 14, wherein the rigidity of said plurality of ribs is set in accordance with the number of said ribs of said plurality of stages.

22. An impact-absorbing structure of a door trim according to claim 14, wherein said plurality of ribs are made of composite-reinforced polypropylene resin molded material.

23. An impact-absorbing structure of a door trim according to claim 14, wherein said plurality of ribs are made of high-crystal polypropylene resin molded material.

24. An impact-absorbing structure of a door trim according to claim 14, wherein said plurality of ribs are formed integrally with said door trim.

25. An impact-absorbing structure of a door trim according to claim 13, wherein said plurality of ribs have three different stages of lengths.

* * * * *